May 22, 1923.
M. KIRKWOOD
1,455,843
SYSTEM FOR MEASURING DISTORTION
Filed Feb. 7, 1920
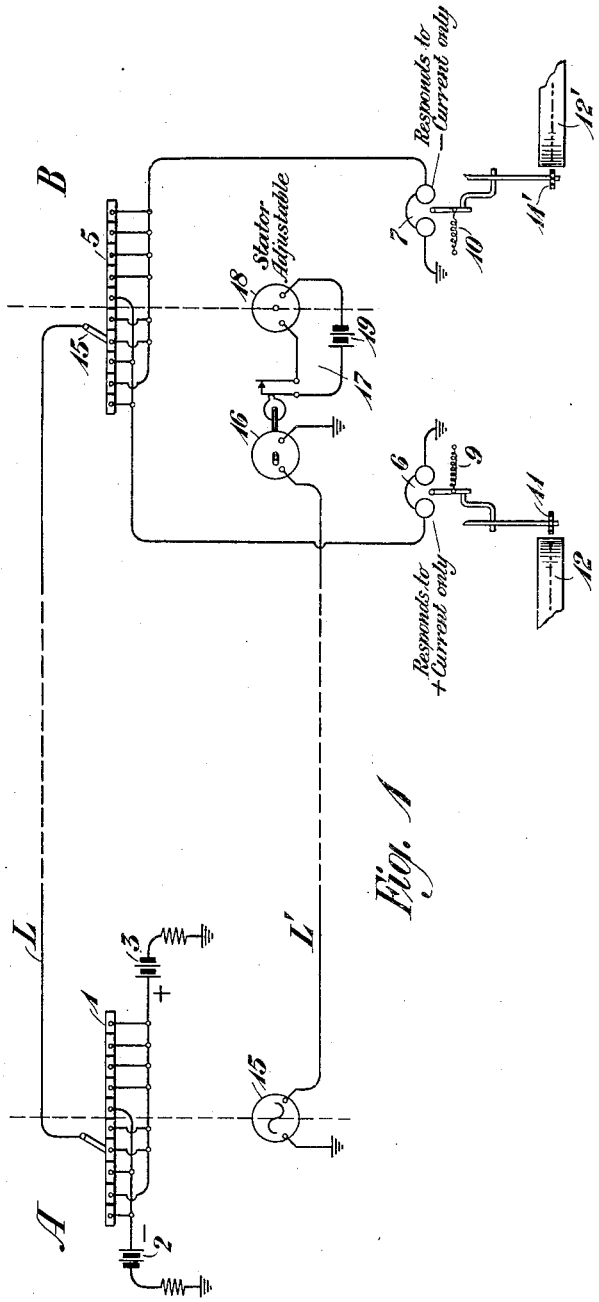
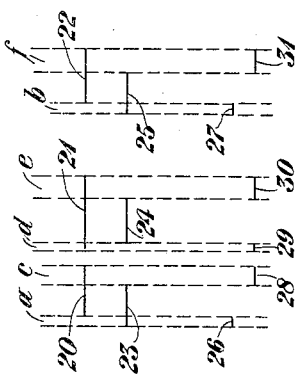
INVENTOR.
M. Kirkwood
BY
ATTORNEY Patented May 22, 1923.

1,455,843

UNITED STATES PATENT OFFICE.

MACLEAN KIRKWOOD, OF EAST ORANGE, NEW JERSEY, ASSIGNOR TO AMERICAN TELEPHONE AND TELEGRAPH COMPANY, A CORPORATION OF NEW YORK.

SYSTEM FOR MEASURING DISTORTION.

Application filed February 7, 1920. Serial No. 356,974.

*To all whom it may concern:*

Be it known that I, MACLEAN KIRKWOOD, residing at East Orange, in the county of Essex and State of New Jersey, have invented certain Improvements in Systems for Measuring Distortion, of which the following is a specification.

This invention relates to telegraph systems and more particularly to the measurement of the distortion in telegraph signals due to the transmission over the line.

Heretofore it has been customary to judge the quality of telegraph signals by ear, an expert operator being able to distinguish between good and "clippy" or "heavy" signals; but the results of such tests are uncertain and unsatisfactory. It has also been proposed to make a record of the undistorted signal as sent out and a record of the distorted signal as received and to compute the distortion by comparing the lengths of corresponding spacing or marking impulses.

It is the object of the present invention to provide means for indicating directly the distortion itself.

In the accompanying drawings Figure 1 illustrates diagrammatically a system for practising the invention and Fig. 2, is a diagram illustrating the character of the distortion records produced.

Referring to Fig. 1, L represents the line whose distorting effect is to be measured. At the sending station A, there is provided a rotating distributor or commutator 1, here shown developed into a straight line for clearness. The segments of this distributor are wired in such a way as to represent some signal or group of signals to be used for testing purposes. In the present instance, the segments are wired to represent the letter C, according to the Morse code, that is three dots spaced thus, . . . , this being done by connecting the 1st, 3rd and 6th segments together and connecting the group to one pole of the battery 2. The other segments of the commutator are likewise connected together and to the other pole of battery 3. The batteries are connected to ground through suitable tap resistances as usual. It will be seen that by rotating the commutator 1 at a uniform speed, impulses accurately representing the letter C will be repeatedly put upon the line.

At the receiving station B, a second distributor or commutator 5 is provided, which is identical in all respects with that at the sending station and with the segments connected together in the same manner. In this case, however, the lead from the 1st, 3rd and 6th segments runs to a polar relay 6 instead of to a battery and the leads from the remaining contacts run to a second polar relay 7. Each of these relays is biased, in any well known ways, to be responsive only to current of a polarity opposite to that which will flow through its windings if an undistorted signal is received over the line and the commuators at the opposite ends of the line are, at the same time, in perfect phase and synchronism; that is, in the case here shown, the relay 6 is arranged to respond only to positive impulses and the relay 7 only to negative impulses. The biasing is here indicated by the springs 9 and 10, though of course any other suitable means for this purpose may be used. Each of the polar relays is arranged to operate a recording mechanism here illustrated as the recording wheel, 11 and 11', and tape, 12 and 12', of a Wheatstone recorder, by which a mark is recorded in ink or otherwise whenever the wheel is moved toward the tape.

For the purpose of maintaining exact synchronism between the distributors at the opposite ends of the line, an alternating current generator 15 of any suitable form is rotated by the mechanism driving the distributor 1. Current from this generator is transmitted to the receiving station B over a separate line L' and there operates the motor 16, which is arranged, in the form of the invention here illustrated—to make and break local circuit 17, containing motor 18 and current source 19. The motor 18 is arranged to drive the distributor 5 at the receiving station and this stator is preferably arranged to be adjustable angularly to take account of the lag due to the line and other apparatus. If a synchronous motor is used at 16 it may drive the commutator directly if desired. Other arrangements are known for maintaining synchronism between two rotating members at opposite ends of a line and any of these may be used in place of that here illustrated.

If now the two distributors be rotating in perfect synchronism and their angular relation with respect to correspondingly connected segments be such that the lag in the entire system is taken account of, then an undistorted signal received at the brush 15 of the distributor 5 will have no effect upon the relays 6 and 7, since negative current will be flowing into the circuit of relay 6 during exactly the time that the 1st, 3rd and 6th segments are under the brush and positive current will be flowing into the circuit of the relay 7 during exactly the time that the 2, 4, 5, 7, 8, 9 and 10, segments are under the brush. If, however, the signal impulses are lengthened or shortened by transmission over the line, the negative impulses will begin too soon or too late and will persist too long or not long enough to correspond to the time at which the 1st, 3rd and 6th contacts are under the brush. For example, let it be supposed that the "marking" impulses received at the brush 15 are represented by the lines 20, 21 and 22 in Fig. 2, the transmitted impulses being represented by the lines 23, 24 and 25. The lines 23, 24 and 25 likewise represent the time periods during which the 1st, 3rd and 6th contacts of the distributor 5 are under the brush. It will be seen, therefore, that there is a period represented at a, during which positive current will be flowing into the relay 6 through the first segment of distributor 5. A similar period occurs at b at the beginning of the reception of the third dot. During the periods indicated as c, d, e and f, on the other hand, negative current will be flowing into relay 7 by reason of the persistence of the signal impulses after the time when the corresponding segments of distributor 5 has passed from under the brush, or in the case of d, the beginning of the received impulses too soon. This means that on tape 12 of relay 6, there will be recorded two lines as shown at 26 and 27 in Fig. 2, while on the tape 12' of relay 7, there will be recorded four lines represented at 28, 29, 30 and 31 in Fig. 2.

The arrangement here described provides as will be seen a means for laying together, as it were, the distorted received signal and an undistorted signal in proper phase relation to show their differences. The distorted signal is represented by the impulses in the brush 15 and the undistorted signal is represented by the segments of the distributor 5 connected in proper electrical relation and passing under the brush at the proper time intervals; and the relays 6 and 7 are so arranged as to record any differences between the periods of beginnings and endings of the distorted and perfect signals.

It is obvious that various modifications in the details of the system here illustrated may be made without departing from the spirit and scope of the present invention.

What I claim is:

1. In a signaling system, means for indicating the transmission character of a line, comprising means at one end for impressing a signal on the line, means at the other end for receiving the signal, and recording means responsive to the difference between the transmitted and the received signal.

2. In a signaling system, a transmission line, a transmitting mechanism at one end of the line, mechanism at the receiving end of the line operated in synchronism with said transmitting mechanism for representing the undistorted transmitted signal, means for maintaining the mechanisms at the transmitting and receiving stations in synchronism, and means for recording the differences between the signal received over the line and the signal as represented on said receiving station mechanism.

3. In a signaling system, a transmission line, a transmitting distributor at one end of the line, a corresponding receiving distributor at the receiving end of the line, means for rotating said distributors in synchronism and means for indicating at the receiving station the difference between the signal received over the line and the undistorted signal as represented by the distributor at the receiving station.

4. In a signaling system, a transmission line, a transmitting mechanism at one end thereof, mechanism at the receiving end thereof for representing the undistorted transmitted signal, means for insuring synchronism and proper phase relation between the said mechanisms at opposite ends of the line, and means for recording the difference between the signal received over the line and the signal as represented by said receiving station mechanism.

In testimony whereof, I have signed my name to this specification this 5th day of February, 1920.

MACLEAN KIRKWOOD.